March 24, 1970 E. H. HILBORN 3,502,389

SCREEN FOR FRONT SURFACE PROJECTION

Filed Dec. 5, 1967

EDWIN H. HILBORN
INVENTOR.

BY
ATTORNEYS.

United States Patent Office 3,502,389
Patented Mar. 24, 1970

3,502,389
SCREEN FOR FRONT SURFACE PROJECTION
Edwin H. Hilborn, Framingham, Mass.
(62 Boylston St., Boston, Mass. 02112)
Filed Dec. 5, 1967, Ser. No. 688,155
Int. Cl. G03b 21/56
U.S. Cl. 350—129
8 Claims

ABSTRACT OF THE DISCLOSURE

A screen for front surface projection having an intersecting array of light energy absorbing partitions and a plurality of discrete parabolic reflector elements. Each intersection of the partitions coincides with a principal axis of a parabolic reflector element and includes the focus of the parabolic reflector element. The partitions are light-absorbing except for a highly reflective area surrounding the focus. The entire structure may be embedded in a transparent material so as to present a substantially planar front surface to the viewer.

ORIGIN OF INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to screens for front surface projection and, more particularly, to a projection screen for reflecting image-bearing light under conditions of high extraneous, ambient illumination.

The prior art front projection screens employ semi-reflecting elements for control of the viewing angle. A completely diffuse screen reflects light with equal efficiency in all directions, thereby wasting light into areas where viewers are not likely to sit because of the perspective distortions attendant with such off-axis viewing. The use of semi-reflective screens, such as beaded or metallic surfaces, produces higher reflection efficiency near the projection axis at the expense of off-axis brightness. However, the highest efficiency is directly on axis, at which position no observer may sit, since his head would intercept the projection beam.

Other prior art projection screens are fabricated to have greater horizontal viewing angles than vertical viewing angles, the relationale being that substantially all of the viewers' heads will be at approximately the same horizontal elevation but will be positioned over an appreciable horizontal angle. While such prior art screens efficiently reradiate the image-bearing light over the desired and controlled horizontal viewing angle, additional elements, such as optical means, are required to render the screen usable under high ambient illumination.

Other screens have introduced light-absorbing elements so as to maintain image contrast under high ambient illumination levels. One such example is composed of pairs of cylindrical optical elements having their rear surfaces made of reflecting material. A black, or light-absorbing layer with clear, transparent apertures located at the foci of the optical elements, is disposed between the two surfaces of the optical elements. Aside from difficulties of fabrication with power registration of the cylindrical elements, it is difficult to maintain the front surface clean and dry so as to secure proper refraction.

SUMMARY OF THE INVENTION

In my device, a screen for the front surface projection of a collimated light beam has a support means and a plurality of thin partitions coupled to the support means for absorbing light energy. The partitions are mounted on their edges in a perpendicular, intersecting, crossed array so that the lines of intersection are parallel to one another and perpendicular to a common plane. A plurality of discrete parabolic reflector elements are juxtaposed to the partitions for imaging rays of the collimated beam at the focus of each parabolic reflected element with the parabolic reflector elements mounted in close array in a plane parallel to the common plane so that the concave surfaces of the parabolic reflector elements are juxtaposed to the edges of the partitions. The principal axis of each, discrete parabolic reflector element is coincident with one particular line of intersection and the focus of the discrete parabolic reflector element is within the particular line of intersection. Additionally, a reflector means is disposed on the partitions, substantially at the focus of each of the discrete parabolic reflector elements.

In one embodiment of my invention, the support means includes a transparent medium having a substantially planar surface parallel to the common plane and opposite to the concave surface of the parabolic reflector elements. The transparent medium and the parabolic reflector elements support the partitions between the front surface and rear surface thereof.

In a further embodiment, each of the parabolic reflector elements is a section of an elliptic paraboloid established by a first plane perpendicular to the principal axis and a second plane parallel to the principal axis so that the line of intersection of the parabolic reflector element and the first plane is a semicircle and the second plane is parallel to a predetermined horizontal plane.

A first planar partition is parallel to the principal axis and a second planar partition is perpendicular to the first planar partition. The partitions intersect each other along the principal axis and includes the focal point. The partitions are made of light-absorbing material and include a highly light-energy-reflective portion located in an area surrounding the focal point. Thus, only the data bearing light is reflected.

It is, therefore, a principal object of the present invention to provide an improved screen for front surface projection having high reflective efficiency over any desired and precalculated viewing angle.

Another principal object of the present invention is to provide an improved screen for front surface projection having a planar front surface that maintains its optical properties even when degraded by the presence of moisture droplets on the external front planar surface.

Still another principal object of the present invention is to provide an improved screen for front surface projections having planar surfaces which may be easily cleaned and maintained.

The features of my invention which I believe to be novel are set forth with particularity in the appended claims. My invention itself, however, both as to its organization and method of operation, together with further objects and advantages thereof, may be best understood by reference to the following description taken in conjunction with the following drawings.

DETAILED DESCRIPTION OF THE EMBODIMENTS

Figure 1:
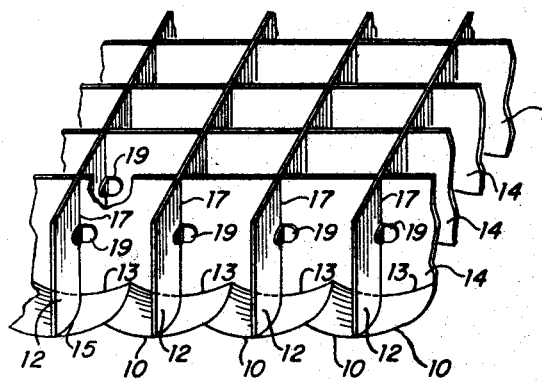
FIG. 1 is a perspective view of my crossed array of thin partitions.
Figure 2:
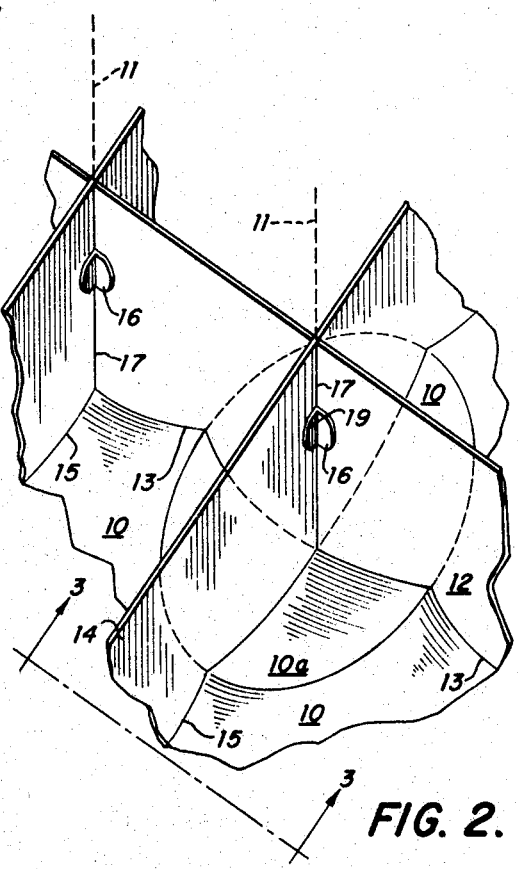
FIG. 2 is a schematic representation showing the principles of my invention.
Figure 3:
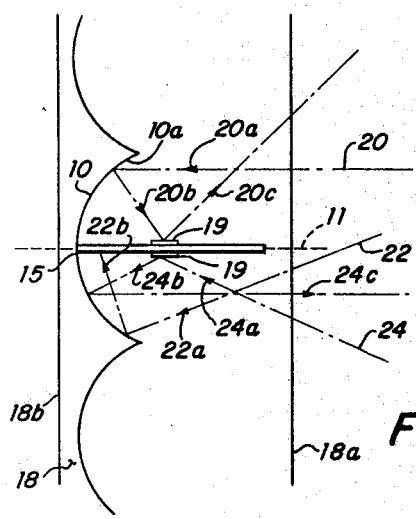
FIG. 3 is a cross-sectional view of the array of FIG. 2, taken along lines 3—3, showing one reflector embodiment of my invention.

Reference is now made to FIG. 1 which, when taken in conjunction with FIGS. 2 and 3, shows the basic structure of a screen for front surface projection of the present invention. A plurality of partitions 12 and 14 are mounted on edges 13 and 15, respectively, in a perpendicular intersecting or crossed array. The lines of intersection are parallel to one another and perpendicular to a common plane 18a. The partitions are constructed of or are coated with one of many light-energy-absorbing materials which are well known in the art.

A plurality of discrete, parabolic, reflector elements 10 is provided, in close array in a plane substantially parallel to common plane 18a for imaging rays of the collimated light beam at the focus 16 of each parabolic reflector element 10. Concave surfaces 10a of reflector element 16 are in contact with edges 13 and 15 of partitions 12 and 14. The principal axis 11 of each reflector element 10 is coincident with one particular line of intersection 17, while focus 16 of the reflector element 10 falls on line of intersection 17. Provision has been made for reflecting the light and consists of a small area 19 of highly reflective material disposed on partitions 12 and 14 substantially at focus 16 of each discrete parabolic reflector element 10. It should be here noted that parabolic reflector element 10 may be made of aluminum which has been polished to optical standards or formed of optical glass with a silvered or aluminum reflecting surface.

The basic structure, consisting of partitions 12 and 14 with reflecting area 19 thereon and discrete parabolic reflector elements 10, is supported in a transparent medium 18, having a rear surface 18b and front, substantially planar surface parallel or coincident with common plane 18a and opposite the concave surface 10a of parabolic reflector element 10. It will thus be seen that the plurality of basic structures are supported between the front surface coincident with common plane 18a and rear surface 18b. Those skilled in the art will recognize that the transparent medium may be made of the plastic resin variety. The smooth front surface permits easy cleaning of the screen and reduces problems in refraction due to the presence of moisture on the surface.

It has been found that the efficiency of the screen, that is, the amount of image-bearing light reflected to a viewer, can be increased by constructing partitions 12 and 14 of thin panels. Further efficiency is achieved by mounting partitions 12 and 14 so that the distance between adjacent lines of intersection 17 is substantially equal.

In order that the discrete parabolic reflector elements 10 may not be seen or distinguished by the eye, it has been found that the distance between the several elements 12 and between the several elements 14 should not be greater than $\frac{1}{3000}$ of the distance to the position of the nearest viewers.

With particular reference now to FIG. 3, there is illustrated the behavior of light rays on one embodiment of my screen made in accordance with the principles of the invention. In this embodiment, light ray 20 represents one ray of an information-bearing collimated beam of light, parallel to principal axis 11 of parabolic reflector element 10 and originate from a projection apparatus (not shown). Light ray 20 enters front surface 18a of transparent medium 18 in the direction of arrowhead 20a and is reflected and imaged from surface 10a of parabolic reflector element 10 towards focus 16 (FIG. 3) in the direction of arrowhead 20b and is there reflected by reflective area 19 on partition 14 towards the viewer in the direction of arrowhead 20c. Light ray 22, representing ambient or extraneous light that enters from surface 18a at an angle in the direction of arrowhead 22a, will be reflected by parabolic reflector element 10 in the direction of arrowhead 22b so as to be absorbed by light-absorbing partition 14. Light ray 24, representing ambient or extraneous light that enters front surface 18a in the direction of arrowhead 24a, will be at such an angle with respect to front surface 18a so as to be reflected towards parabolic element 10 in the direction of arrowhead 24b and then emerge from surface 18a in the direction of arrowhead 24c as a beam of light parallel to the axis. However, while this reflected beam of light will be reflected back towards the projector, it will not disturb or bother the viewer.

Figure 4:
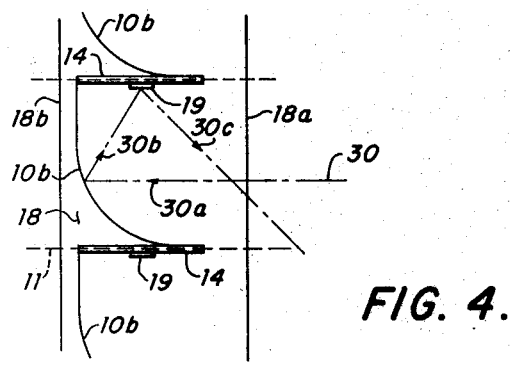
FIG. 4 is a cross-section of my novel array, showing another reflector embodiment having particular applicability in my invention.

Referring now to FIG. 4, there is shown another embodiment of the subject invention wherein it will be seen that like numerals refer to like elements of FIGS. 1, 2 and 3. In this latter embodiment, a screen construction is proposed to resolve the problem that arises when the projector is located at a position substantially above the viewers. In effect, the parabolic reflector element 10 of FIGS. 1, 2 and 3 is cut in half to form a plurality of discrete parabolic reflector elements 10b which is a substitute for the reflector elements 10a of FIGS. 2 and 3. As is well known, a parabolic reflector is a section of an elliptic paraboloid. Parabolic reflector elements 10b are established by a first plane perpendicular to principal axis 11 and a second plane parallel to principal axis 11 so that the line of intersection of the parabolic reflector element and the first plane is a semicircle and the second plane is perpendicular to a predetermined horizontal plane, determined by the average position of the viewers' eyes.

An information-bearing, collimated light beam represented by a light ray 30, travelling in the direction of arrowhead 30a from its source such as a projection apparatus (not shown) will be reflected by element 10a in the direction of arrowhead 30b and imaged to focus 16. However, it will be reflected by reflective area 19 in the direction of arrowhead 30c towards the viewers located either below or lateral with respect to the projection apparatus, as represented by the collimated light beam. This particular embodiment, therefore, avoids the wasting of reflected light into areas above the projection apparatus where no viewers are located.

It should further be understood that while a flat screen has been described for illustrative purposes, the technique is equally applicable to a screen having some curvature using the projector position as a radius, as is the more usual art for professional projection.

While I have described what is presently considered the preferred embodiments of my invention, it will be obvious to those skilled in the art that various other changes and modifications may be made thereon without departing from the inventive concept contained therein and it is, therefore, aimed in the appended claims to cover all such changes and modifications as fall within the true spirit and scope of my invention.

What I claim is:

1. A screen for front surface projection of a collimated light beam for viewing by a plurality of viewers arranged at approximately the same horizontal elevation and positioned over a wide horizontal angle with respect to the screen comprising in combination:
    support means;
    a first plurality of partitions coupled to the support means for absorbing light energy;
    a second plurality of partitions coupled to the support means for absorbing light energy;
    both plurality of partitions mounted on respective edges in a perpendicular, intersecting array so that the lines of intersection formed therebetween are parallel to one another and perpendicular to a common plane;
    a plurality of discrete parabolic reflector elements for imaging rays of the collimated light beam at the focus of each parabolic reflector element mounted in close array in a plane parallel to the common plane so that the concave surfaces of the parabolic reflector elements are juxtaposed to the edges of the light energy absorbing partitions, and light energy reflector means disposed on the partitions substantially at the focus of each of the discrete parabolic reflector elements.

2. The screen of claim 1 wherein:
the support means includes a transparent medium having substantially planar front and rear surfaces;
the front surface being parallel to the common plane and opposite the concave surface of the parabolic reflector elements;
the rear surface supporting the light energy absorbing partitions, and
the parabolic reflector elements positioned between the front and rear surfaces.

3. The screen of claim 2 wherein:
the light energy absorbing partitions are thin members arranged in a crossed array.

4. The screen of claim 3 wherein:
the light energy absorbing partitions are arranged so that the distances between adjacent lines of intersections are substantially equal.

5. The screen of claim 4 wherein:
the principal axis of a discrete parabolic reflector is coincident with one particular line of intersection, and
the focus of the discrete parabolic reflector is within the particular line of intersection.

6. The screen of claim 5 wherein:
the distance between each of the first plurality of partitions and the distance between each of the second plurality of partitions is approximately $1/3000$ of the distance between the screen and the position of the nearest viewer.

7. The screen of claim 4 wherein:
each of the parabolic reflector elements is a section of an elliptic paraboloid established by a first plane perpendicular to the principal axis and a second plane parallel to the principal axis;
the line of intersection of the parabolic reflector element and the first plane is a semicircle, and
the second plane is parallel to a predetermined horizontal plane.

8. The screen of claim 7 wherein:
the distance between each of the first plurality of partitions and the distance between each of the second plurality of partitions is approximately $1/3000$ of the distance between the screen and the position of the nearest viewer.

References Cited

UNITED STATES PATENTS

| | | | |
|---|---|---|---|
| 3,180,214 | 4/1965 | Fox | 350—128 |
| 3,191,495 | 6/1965 | Miller | 350—128 |

JULIA E. COINER, Primary Examiner

U.S. Cl. X.R.

350—128